(12) United States Patent
Shitara et al.

(10) Patent No.: US 11,383,628 B2
(45) Date of Patent: Jul. 12, 2022

(54) VEHICLE CABIN STRUCTURE

(71) Applicant: Toyota Jidosha Kabushiki Kaisha, Toyota (JP)

(72) Inventors: Masaki Shitara, Nagakute (JP); Yasukazu Honda, Miyoshi (JP); Shingo Maeda, Toyota (JP); Takeshi Go, Toyota (JP); Yuchi Yamanouchi, Toyota (JP); Ryo Hattori, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 120 days.

(21) Appl. No.: 16/912,899

(22) Filed: Jun. 26, 2020

(65) Prior Publication Data

US 2020/0406802 A1  Dec. 31, 2020

(30) Foreign Application Priority Data

Jun. 28, 2019 (JP) .............................. JP2019-121543
Jul. 22, 2019 (JP) .............................. JP2019-134340

(51) Int. Cl.
| | | |
|---|---|---|
| *B60N 3/02* | (2006.01) | |
| *B60R 13/02* | (2006.01) | |
| *F16B 5/06* | (2006.01) | |
| *B62D 27/06* | (2006.01) | |

(52) U.S. Cl.
CPC ............ *B60N 3/026* (2013.01); *B60R 13/025* (2013.01); *B62D 27/065* (2013.01); *F16B 5/06* (2013.01)

(58) Field of Classification Search
CPC . B60N 3/026; B60R 2013/0287; B60R 13/02; B60R 13/025
See application file for complete search history.

(56) References Cited

U.S. PATENT DOCUMENTS

| | | | | |
|---|---|---|---|---|
| 5,641,195 A | * | 6/1997 | Patel ..................... | B60R 13/025 280/751 |
| 5,938,273 A | * | 8/1999 | Williams ............... | B60R 13/025 296/187.05 |
| 6,824,201 B2 | * | 11/2004 | Miyazaki ............ | B60R 13/0206 296/1.08 |
| 8,104,813 B2 | * | 1/2012 | She ....................... | B60R 13/025 296/1.08 |
| 8,636,313 B2 | * | 1/2014 | Huelke .................. | B60N 3/026 296/1.02 |
| 10,875,473 B2 | * | 12/2020 | Isosaki .................. | B60R 13/025 |
| 2005/0236818 A1 | * | 10/2005 | Hirose .................. | B60R 21/213 280/730.2 |
| 2009/0250911 A1 | * | 10/2009 | Sia, Jr. .................. | B60R 13/025 280/728.3 |
| 2014/0367946 A1 | * | 12/2014 | Osterhout ............. | B60R 22/201 280/730.2 |
| 2019/0176761 A1 | * | 6/2019 | Doi ........................ | B60S 1/023 |
| 2020/0406851 A1 | * | 12/2020 | Gammill ............... | B60R 21/232 |

FOREIGN PATENT DOCUMENTS

JP        2016-128295 A        7/2016

* cited by examiner

*Primary Examiner* — Jason S Morrow
(74) *Attorney, Agent, or Firm* — Dinsmore & Shohl LLP

(57) ABSTRACT

A vehicle cabin structure includes a pillar constituting a framework of a vehicle cabin, and a pillar trim which is an interior member arranged with a clearance from a vehicle cabin inside facing surface of the pillar and covering the vehicle cabin inside facing surface of the pillar. The pillar trim has, in its surface facing toward inside of the vehicle cabin, a slit extending along the pillar.

17 Claims, 15 Drawing Sheets

A-A CROSS-SECTION

US 11,383,628 B2

VEHICLE CABIN STRUCTURE

CROSS REFERENCE TO RELATED APPLICATIONS

This application claims priority to Japanese Patent Applications No. 2019-134340 filed on Jul. 22, 2019, and No. 2019-121543 filed on Jun. 28, 2019, each of which is incorporated herein by reference in its entirety including the specification, claims, drawings, and abstract.

TECHNICAL FIELD

The present disclosure relates to a vehicle cabin structure, and more particularly to a vehicle cabin structure in which an interior article can be fixed at an arbitrary position.

BACKGROUND

For camper vans and the like, there is proposed a structure in which a plurality of horizontal grooves are provided in a wall surface inside a vehicle cabin, and by fitting a base portion of a hook into the horizontal grooves, an interior article can be attached at an arbitrary position (for example, see JP 2016-128295 A).

SUMMARY

As the background technology disclosed in JP 2016-128295 A involves a structure in which grooves are provided in a wall surface, there are cases where this technology cannot be easily applied to vehicles having a small wall surface area. Further, according to the structure in which a base of a hook is fitted into the grooves, the securing strength of the hook with respect to the wall surface may sometimes be too low so that an interior article cannot be sufficiently fixed.

The present disclosure is directed to providing a vehicle cabin structure in which an interior article can be fixed at an arbitrary position in a vehicle having a small wall surface area.

A vehicle cabin structure according to the present disclosure includes a frame member extending in a vehicle vertical direction or a vehicle longitudinal direction and constituting a framework of a vehicle cabin, and also includes a frame trim which is an interior member arranged with a clearance from a vehicle cabin inside facing surface of the frame member and covering the vehicle cabin inside facing surface of the frame member, wherein a surface of the frame trim facing toward the inside of the vehicle cabin includes a slit extending along the frame member.

Since a slit capable of fixing an interior article is provided in the frame trim that covers the frame member, an interior article can be fixed at an arbitrary position even in a vehicle having a small wall surface area.

The vehicle cabin structure according to the present disclosure may include: a positioning member arranged in the clearance between the frame trim and the frame member and having a width larger than the slit; an attachment arranged opposing the positioning member across the slit and having a width larger than the slit, the attachment capable of fixing an interior article on the inside of the vehicle cabin; and a fastening member that fastens the positioning member and the attachment to each other via the slit and secures the attachment to the frame trim.

Since the attachment is secured to the frame trim by firmly sandwiching the frame trim between the attachment and the positioning member, the attachment can be secured rigidly to the frame trim. Accordingly, it becomes possible to fix an interior article to which large load is applied, such as a handrail.

A vehicle cabin structure according to the present disclosure includes a frame member extending in a vehicle vertical direction or a vehicle longitudinal direction and constituting a framework of a vehicle cabin, and also includes a frame trim which is an interior member covering a vehicle cabin inside facing surface of the frame member, wherein the frame trim includes, in its vehicle cabin inside facing portion, a groove extending along the frame member, and the groove has an opening width which is narrower than its inner groove width.

Since a groove capable of fixing an interior article is provided in the frame trim that covers the frame member, an interior article can be fixed at an arbitrary position even in a vehicle having a small wall surface area.

The vehicle cabin structure according to the present disclosure may include: a positioning member arranged in the groove in the frame trim and having a width larger than the opening width of the groove; an attachment arranged opposing the positioning member across an opening of the groove and having a width larger than the opening width of the groove, the attachment capable of fixing an interior article on the inside of the vehicle cabin; and a fastening member that fastens the positioning member and the attachment to each other via the opening of the groove and secures the attachment to the frame trim.

As the attachment is secured to the frame trim by firmly sandwiching the frame trim between the attachment and the positioning member, the attachment can be secured rigidly to the frame trim. Accordingly, it becomes possible to fix an interior article to which large load is applied, such as a handrail.

In the vehicle cabin structure according to the present disclosure, the frame member may be a pillar extending in the vehicle vertical direction or may be an upper side member connected to the pillar and extending in the vehicle longitudinal direction, and the frame trim may have the attachment secured thereto in a plural number. Further, a handrail may be fixed to the attachments.

By fixing the handrail using the plurality of attachments, the handrail can be fixed more rigidly.

The vehicle cabin structure according to the present disclosure may include a positioning member having one end attached to the frame member and the other end extending into the slit in the frame trim, and may also include an attachment having a base portion fastened to the other end of the positioning member and a tip portion to which an interior article is fastened.

By mounting the positioning member to the frame member, the mounting strength of the positioning member can be increased, and it becomes possible to sufficiently support an interior component which involves application of large load to the attachment.

In the vehicle cabin structure according to the present disclosure, the one end of the positioning member may be attached to the frame member in such a manner that a position of attachment to the frame member is changeable.

By configuring such that the position of attachment of the positioning member is changeable as described above, an interior article can be fixed at an arbitrary position.

The vehicle cabin structure according to the present disclosure may include the positioning member in a plural number, and the positioning members may be secured to respective portions of the frame member.

By securing the plurality of positioning members as described above, an interior article can be fixed at various positions.

In the vehicle cabin structure according to the present disclosure, the attachment may have a triangular annular shape with a substantially rectangular cross-section, wherein one side constitutes the base portion, and a vertex portion located opposite to the one side constitutes the tip portion.

Consistency in shapes of interior articles may be achieved by forming a handle on a strap or other articles provided in the vehicle cabin as a triangular annular member.

In the vehicle cabin structure according to the present disclosure, the base portion of the attachment may include a base fastening portion that is fastened to the other end of the positioning member, and the tip portion of the attachment may include a tip fastening portion to which an interior article is fastened. The base fastening portion and the tip fastening portion may each have a solid, substantially rectangular cross-section. A portion between the base fastening portion and the tip fastening portion may have a substantially rectangular, hollow cross-section, and may have a thickness that increases toward the base fastening portion or toward the tip fastening portion.

By forming a portion to have a hollow cross-sectional shape, weight reduction can be achieved. Further, by increasing the thickness of this portion toward the base fastening portion or the tip fastening portion which are solid, the difference in thickness with respect to the base fastening portion or the tip fastening portion can be reduced, and it becomes possible to suppress formation of dents in a design surface near the base fastening portion or the tip fastening portion at the time of shaping.

In the vehicle cabin structure according to the present disclosure, the frame member may be a pillar extending in the vehicle vertical direction or may be an upper side member connected to the pillar and extending in the vehicle longitudinal direction. The frame member may have the positioning member secured thereto in a plural number, and two or more of the plurality of positioning members may have attachments fastened thereto. Further, a handrail may be fixed to the attachments.

By fixing the handrail using the plurality of attachments, the handrail can be fixed more rigidly.

According to the present disclosure, it is possible to provide a vehicle cabin structure in which an interior article can be fixed at an arbitrary position in a vehicle having a small wall surface area.

BRIEF DESCRIPTION OF DRAWINGS

Embodiments of the present disclosure will be described with reference to the following figures, wherein.

DESCRIPTION OF EMBODIMENTS

Figure 1:
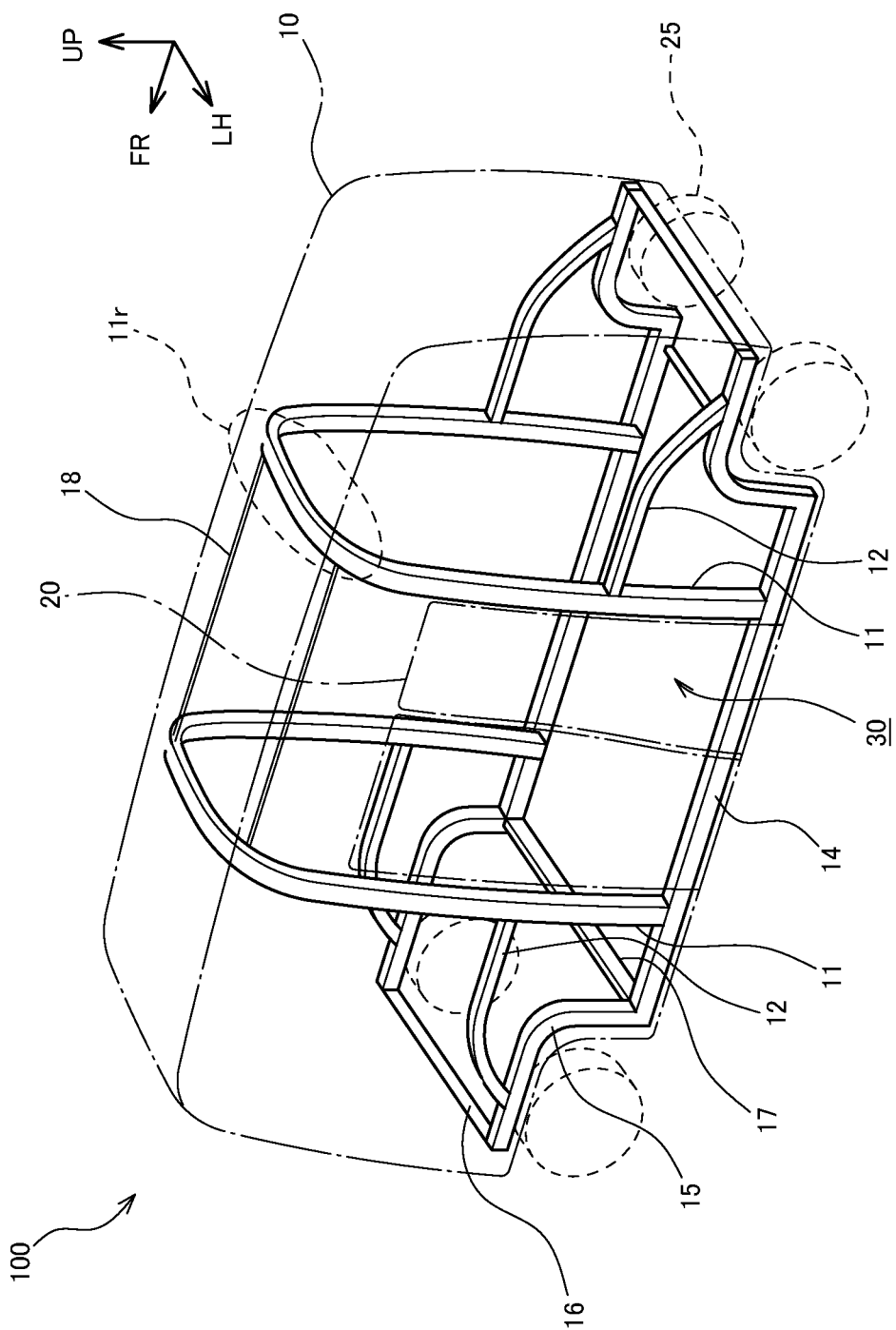
FIG. 1 is a perspective view showing a frame structure of a vehicle cabin having a vehicle cabin structure according to an embodiment.

A vehicle cabin structure 30 according to an embodiment is described below by reference to the drawings. First, referring to FIG. 1, an electric bus 100 comprising the vehicle cabin structure 30 is described. The arrow FR, arrow UP, and arrow LH shown in the drawings respectively denote the front direction (i.e., forward travel direction), upward direction, and left direction of the vehicle. Further, the opposite directions of the arrows FR, UP, and LH denote the rear direction, downward direction, and right direction of the vehicle. Hereinafter, when a description is given referring simply to longitudinal, lateral, and vertical directions, unless otherwise specified, these directions respectively denote the vehicle longitudinal direction, vehicle lateral direction (i.e., vehicle width direction), and vehicle vertical direction.

As shown in FIG. 1, the electric bus 100 comprises a vehicle cabin 10, a door 20 provided in a side surface of the vehicle cabin 10 for getting on and off the vehicle, and wheels 25 driven by a motor not shown. The vehicle cabin 10 has a frame structure, and is mounted on a ladder frame not shown.

The framework of the vehicle cabin 10 is constituted with pillars 11, upper side members 12, floor side members 14, lower side members 15, cross members 16, 17, and roof members 18. The floor side members 14 are members extending in the longitudinal direction at both ends, in the width direction, of the lower part of the vehicle cabin 10. The lower side members 15 are members extending upward from the front ends or rear ends of the floor side members 14 and extending in the vehicle longitudinal direction above the wheels 25. The cross members 16 are members connecting the front ends or rear ends of the lower side members 15 to each other in the width direction. The cross members 17 are members connecting the front ends or rear ends of the floor side members 14 to each other in the width direction.

The pillars 11 are members attached to the left and right floor side members 14 and extending in the vehicle vertical direction. The pillars 11 are provided respectively toward the front and the rear of the vehicle, and the door 20 is arranged between the front and rear pillars 11. The upper ends of the left and right pillars 11 are connected to each other in an inverted U shape to form roof portions 11r. The upper side members 12 are members that are connected to the pillars 11, that extend toward the front or the rear of the vehicle, and that have tips connected to the lower side members 15. The roof members 18 are members that connect the roof portions 11r of the pillars 11 in the vehicle longitudinal direction.

Here, the pillars 11 are frame members extending in the vehicle vertical direction and constituting the framework of the vehicle cabin 10. The upper side members 12 are frame members extending in the vehicle longitudinal direction and constituting the framework of the vehicle cabin 10.

Figure 2:
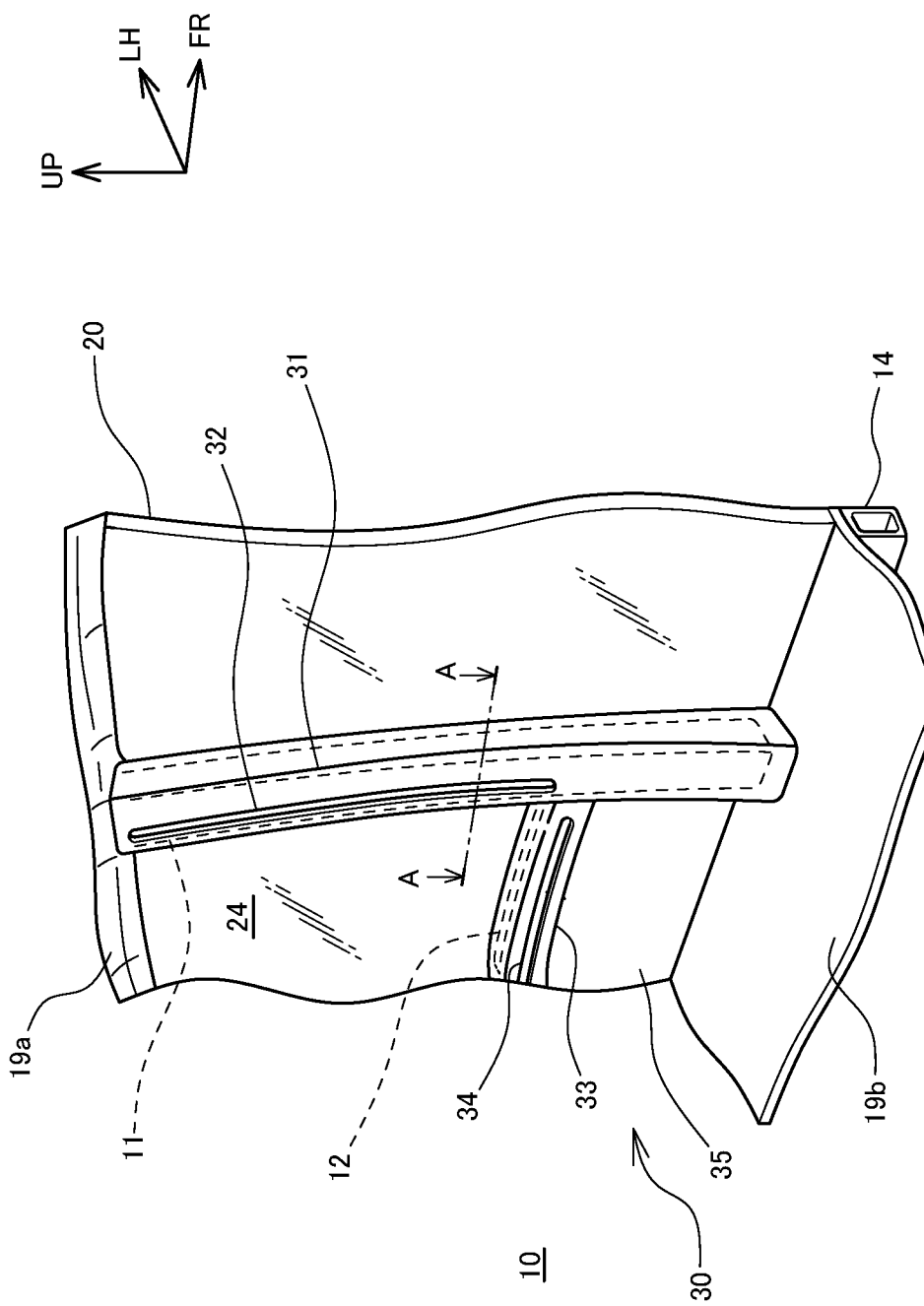
FIG. 2 is a perspective view of the vehicle cabin structure according to the embodiment as viewed from inside the vehicle.
Figure 3:
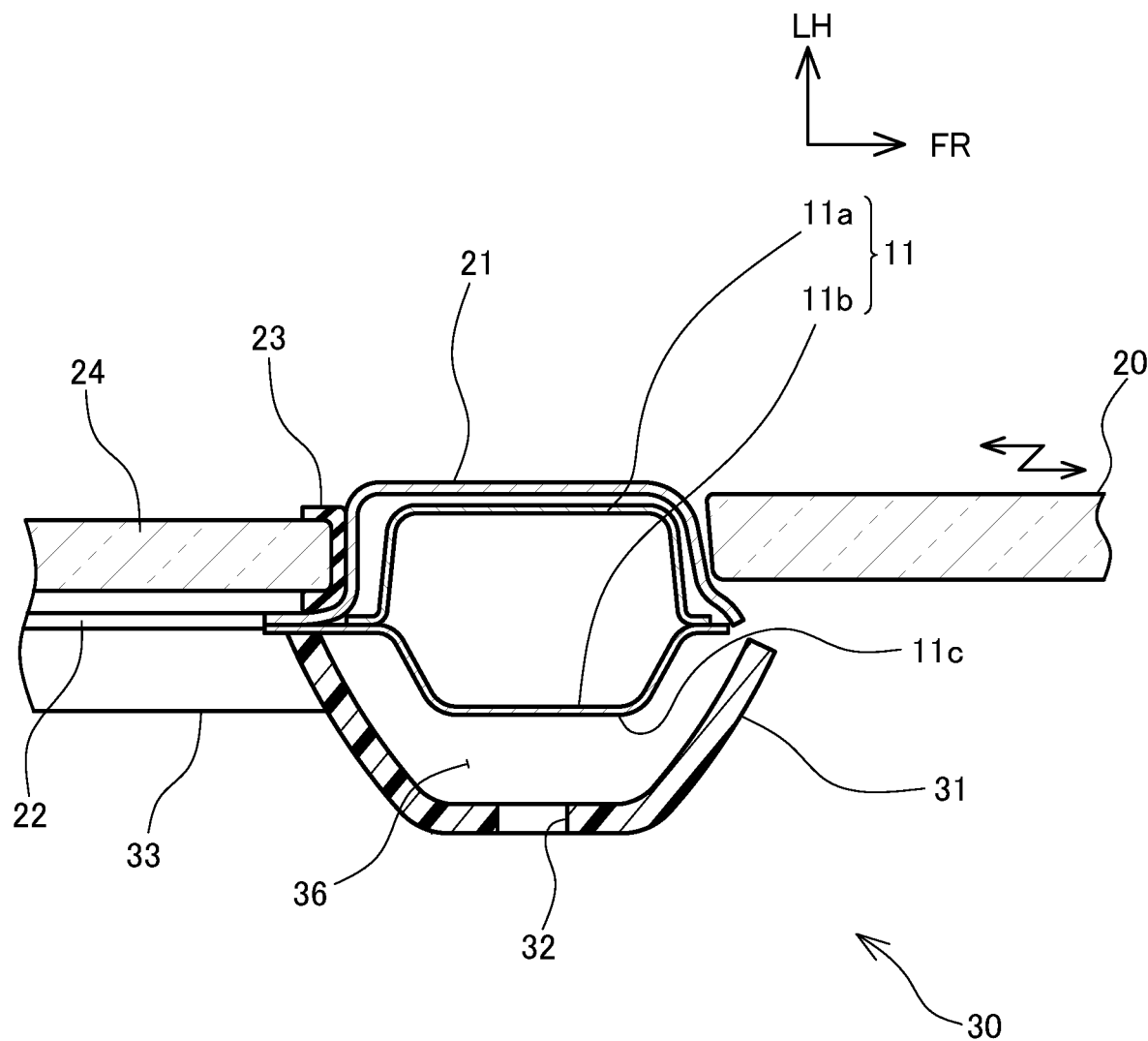
FIG. 3 is a cross-sectional view taken along line A-A shown in FIG. 2.

The vehicle cabin structure 30 is next described by reference to FIGS. 2 and 3. FIG. 2 is a perspective view of an area around the pillar 11 located toward the rear of the vehicle on the left, as viewed from inside the vehicle cabin. FIG. 3 is a cross-sectional view taken along line A-A in FIG. 2. As shown in FIG. 2, the vehicle cabin structure 30 is constituted with the pillar 11 and the upper side member 12 which are frame members, and also with a pillar trim 31 and a side member trim 33. The pillar trim 31 and the side member trim 33 are frame trims.

As shown in FIG. 3, the pillar 11 is a member having a closed cross-section, formed by combining an outer pillar part 11a and an inner pillar part 11b, each of which is a member having a hat-shaped cross-section. To the vehicle outer side of the pillar 11, an outer panel 21 constituting a design surface is attached. To the vehicle rear side of the outer panel 21, a window glass 24 is mounted via a rubber member 23. Further, on the front side of the pillar 11, the door 20 that opens and closes by sliding in the vehicle longitudinal direction is arranged. To the vehicle cabin inside portion of the outer panel 21, an inner panel 22 is connected.

The pillar trim 31 is an interior member made of resin and covering a vehicle cabin inside facing surface 11c of the pillar 11. The pillar trim 31 is a member having a trapezoidal groove-shaped cross-section, and is arranged with a clearance 36 from the vehicle cabin inside facing surface 11c of the pillar 11. The pillar trim 31 may be attached to the inner panel 22, or may be attached to the pillar 11.

As shown in FIG. 2, the pillar trim 31 extends between a ceiling 19a and a floor 19b of the vehicle cabin 10, and covers the vehicle cabin inside facing surface 11c of the pillar 11. In the center of the surface of the pillar trim 31 facing toward the vehicle cabin inside, a slit 32 is provided extending in the vehicle vertical direction along the pillar 11.

Although not shown, the upper side member 12 is a member having a closed cross-section, similar to the pillar 11. The side member trim 33 is arranged with a clearance from the vehicle cabin inside facing surface of the upper side member 12, in a manner similar to the pillar trim 31. The side member trim 33 may be attached to the inner panel 22, or may be attached to the upper side member 12.

As shown in FIG. 2, the side member trim 33 is an interior member that is connected to a side surface of the pillar trim 31 facing toward the vehicle rear, that extends toward the vehicle rear, and that covers a vehicle cabin inside facing surface of the upper side member 12. The lower side portion of the side member trim 33 and the vehicle rear facing portion of the lower part of the pillar trim 31 are connected to an interior panel 35. In the surface of the side member trim 33 facing toward the vehicle cabin inside, a slit 34 is provided extending in the vehicle longitudinal direction along the upper side member 12.

Next, referring to FIGS. 4 and 5, a description is given regarding an attachment 40 to be secured to the pillar trim 31 and the side member trim 33 of the vehicle cabin structure 30 described by reference to FIGS. 2 and 3, and also regarding a handrail 50 to be attached to the attachment 40.

Figure 4:
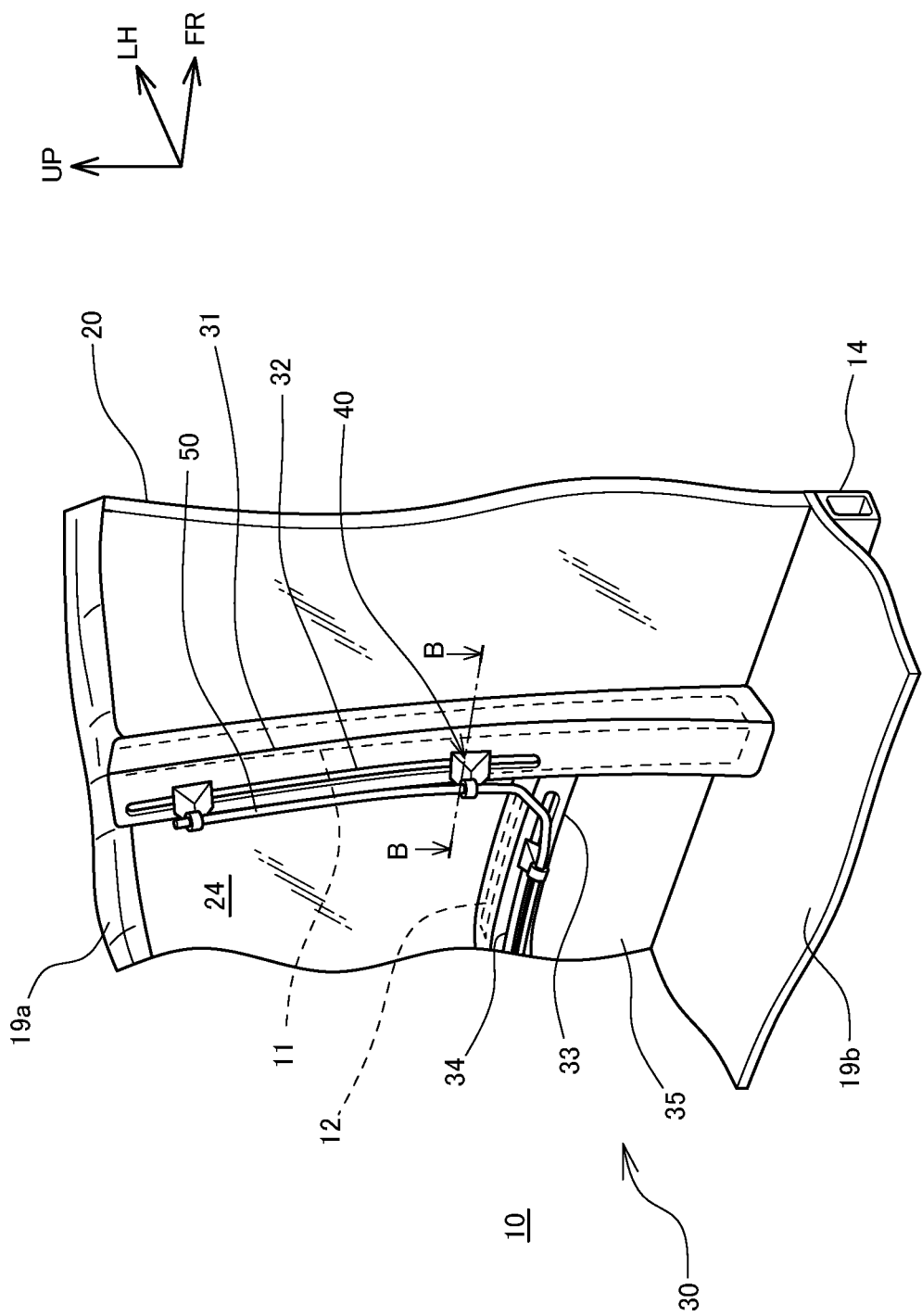
FIG. 4 is a perspective view showing a state in which attachments are secured to a pillar trim and a side member trim of the vehicle cabin structure shown in FIG. 2, and a handrail is fixed to the secured attachments.

As shown in FIG. 4, attachments 40 are secured respectively to the vehicle cabin inside facing surface of the pillar trim 31 and the side member trim 33.

Figure 5:
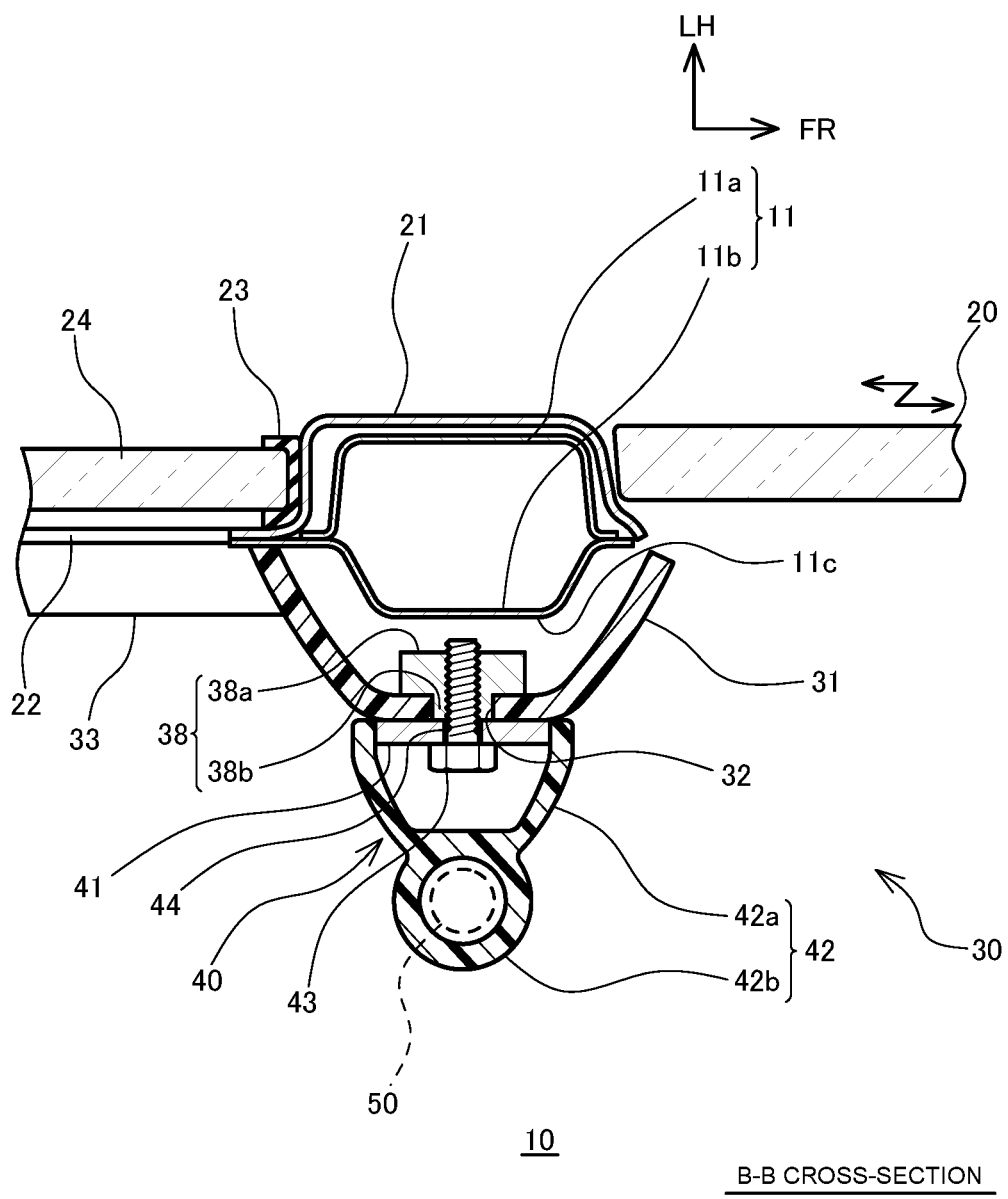
FIG. 5 is a cross-sectional view taken along line B-B shown in FIG. 4.

As shown in FIG. 5, an attachment 40 is secured to the pillar trim 31 by a positioning member 38 and a bolt 43.

The positioning member 38 is arranged in the clearance 36 between the pillar trim 31 and the vehicle cabin inside facing surface 11c of the pillar 11. The positioning member 38 has a width larger than the width of the slit 32, and includes a base portion 38a arranged in the clearance 36 and a protrusion 38b fitted into the slit 32. The positioning member 38 has a threaded hole formed in the center.

The attachment 40 comprises a base 41, and a main body 42 fitted onto the base 41. The main body 42 comprises a mount portion 42a fitted onto the base 41, and a handrail attaching portion 42b protruding from the mount portion 42a toward the vehicle cabin inside. In the center of the base 41, a through-hole 44 is provided, which is penetrated through by the bolt 43 serving as a fastening member.

Mounting of the attachments 40 is carried out according to the following procedure. First, the positioning member 38 is arranged in the clearance 36 between the pillar trim 31 and the vehicle cabin inside facing surface 11c of the pillar 11. Subsequently, the protrusion 38b of the positioning member 38 is fitted at a desired position in the slit 32 so as to select the position. The bolt 43 is placed through the through-hole 44 in the base 41 of the attachment 40, and the base 41 of the attachment 40 is arranged opposite to the positioning member 38. Subsequently, the bolt 43 is screwed into the threaded hole of the positioning member 38. When the bolt 43 is tightened, the bolt 43 fastens the positioning member 38 and the base 41 to each other through the slit 32. In that state, the peripheral part of the slit 32 in the pillar trim 31 is firmly sandwiched between the positioning member 38 and the base 41. In this way, the base 41 is secured onto the pillar trim 31. In a similar manner, a base 41 is also secured onto the side member trim 33.

The handrail attaching portions 42b of the main bodies 42 are fitted around the handrail 50 at predetermined locations. After securing the bases 41 to the pillar trim 31 and the side member trim 33, the mount portions 42a of the main bodies 42 to which the handrail 50 is attached are fitted onto the bases 41. In this way, the handrail 50 can be attached to the pillar trim 31 and the side member trim 33 as shown in FIG. 4.

In the vehicle cabin structure 30 according to the above-described embodiment, because the slits 32, 34 capable of securing the attachment 40 are provided in the pillar trim 31 and the side member trim 33 covering the pillar 11 and the upper side member 12, an interior article can be fixed at an arbitrary position even in a vehicle having small wall surface area. By sandwiching and fixing the peripheral part of the slit 32 in the pillar trim 31 between the positioning member 38 and the base 41, the attachment 40 can be secured onto the pillar trim 31. With this arrangement, in the vehicle cabin structure 30, the attachment 40 can be secured rigidly to the pillar trim 31, and it becomes possible to fix an interior article to which large load is applied, such as a handrail 50, to the attachment 40. Further, in the vehicle cabin structure 30, because a plurality of attachments 40 can be secured to the pillar trim 31 and the side member trim 33, the handrail 50 can be fixed more rigidly. Moreover, according to the vehicle cabin structure 30, as an attachment 40 is secured to the side member trim 33 extending in the vehicle longitudinal direction, it is possible to fix an interior article to which large load is applied in the vertical direction.

Although it was explained that, in the vehicle cabin structure 30 according to the above-described embodiment, the slits 32, 34 capable of securing the attachment 40 are provided in the pillar trim 31 and the side member trim 33 covering the pillar 11 and the upper side member 12, such a slit may be provided in a trim covering other frame members extending in the longitudinal direction, such as the roof member 18.

Next, a vehicle cabin structure 60 according to another embodiment is described by reference to FIG. 6. In the following, elements similar to those of the vehicle cabin structure 30 according to the embodiment described above referring to FIGS. 1 to 5 are labeled with like reference numerals, and descriptions thereof will not be repeated.

Figure 6:
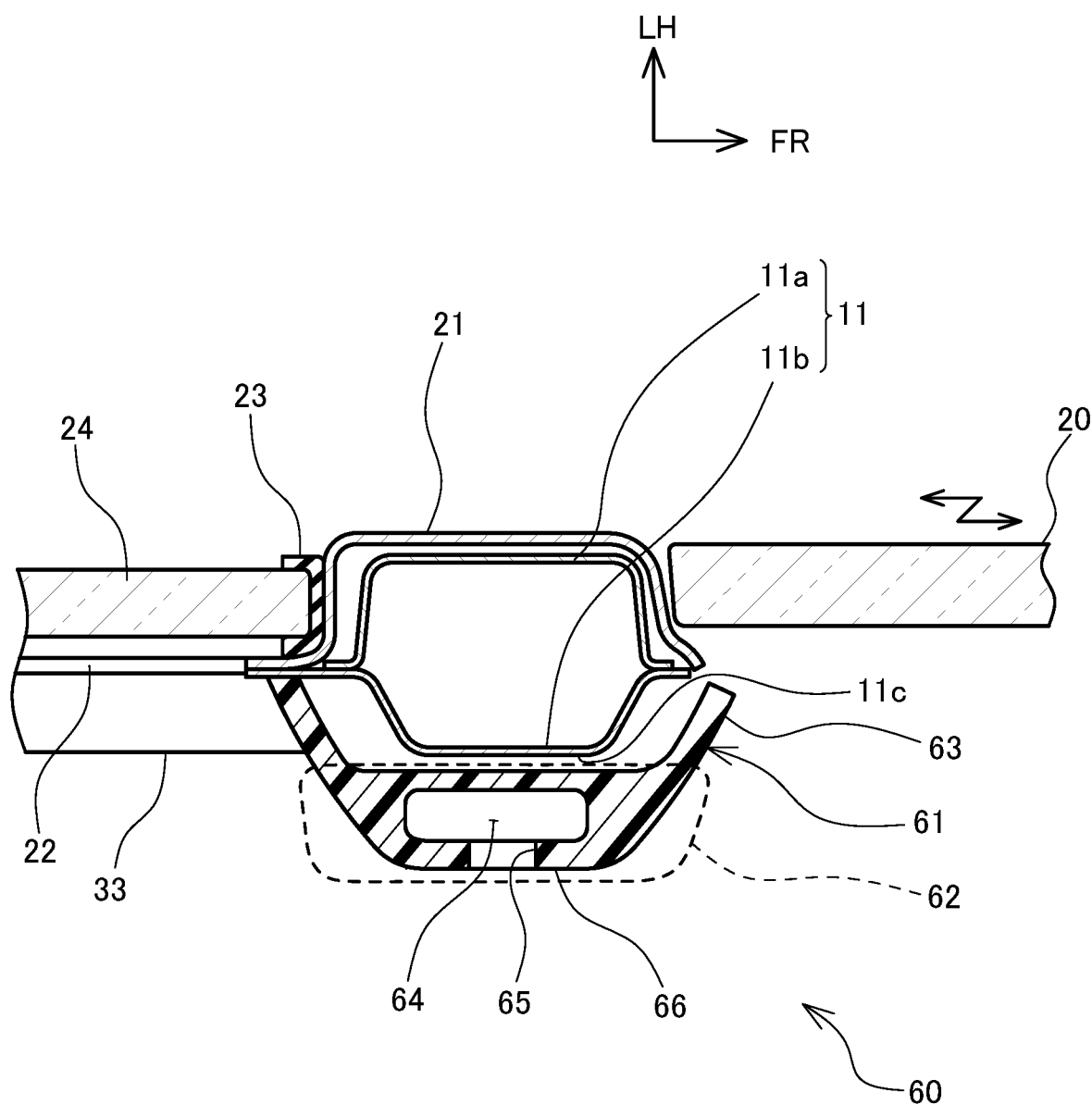
FIG. 6 is a cross-sectional view of a pillar and a pillar trim of a vehicle cabin structure according to a further embodiment.

As shown in FIG. 6, a pillar trim 61 of the vehicle cabin structure 60 comprises a vehicle cabin inside facing portion 62 having a large plate thickness, and a skirt portion 63 having a small plate thickness and extending from the vehicle cabin inside facing portion 62 toward the vehicle outside. The vehicle cabin inside facing portion 62 covers the vehicle cabin inside facing surface 11c of the pillar 11, while the skirt portion 63 covers the side surfaces of the pillar 11. In the vehicle cabin inside facing portion 62, a groove 64 is provided extending in the vehicle vertical direction along the pillar 11. An opening width of an opening 65 of the groove 64 is narrower than an inner groove width of the groove 64. Accordingly, on both sides of the opening 65 in the width direction, lip portions 66 are formed projecting from the two side surfaces of the groove 64 toward the opening 65.

Figure 7:
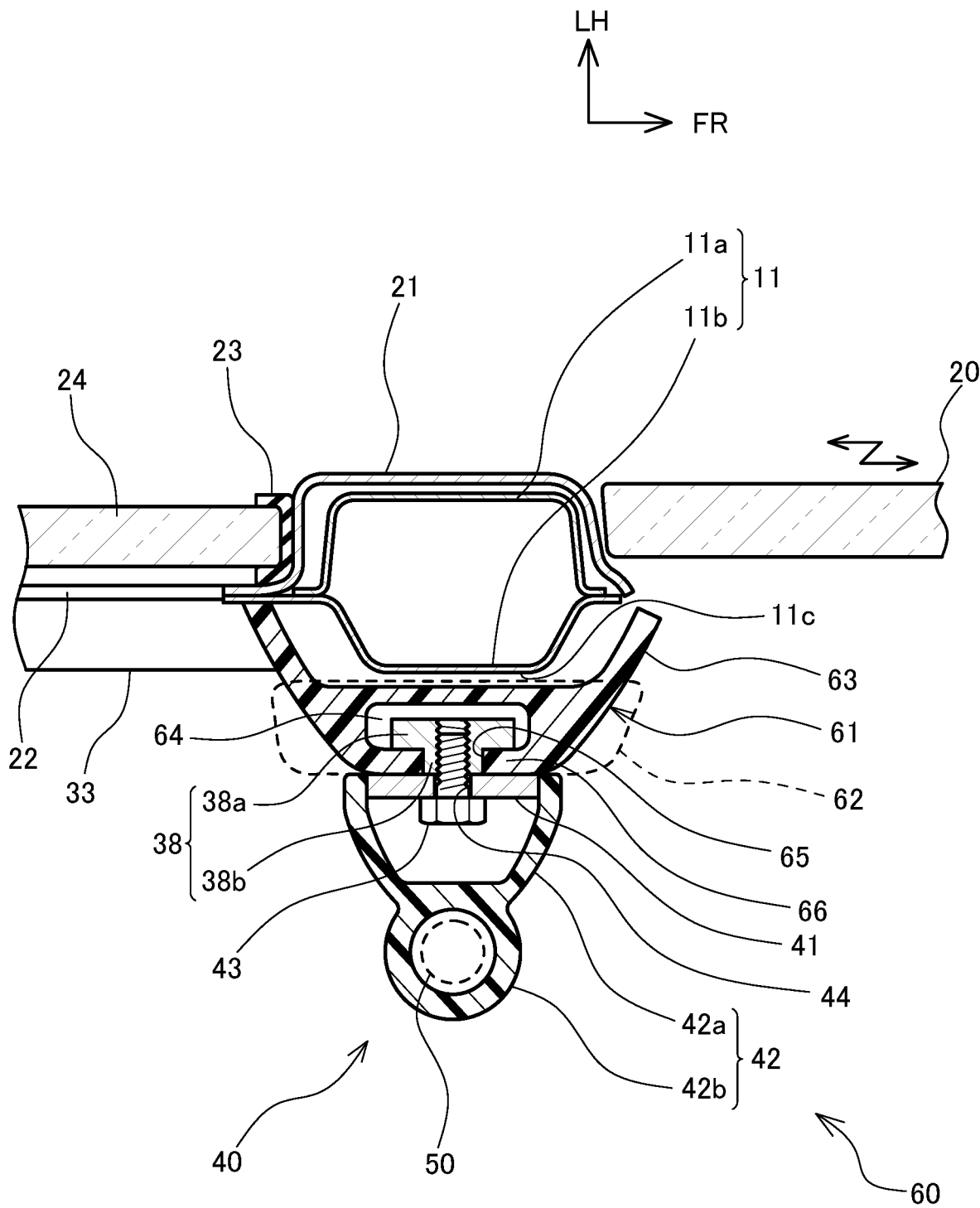
FIG. 7 is a cross-sectional view of the pillar, the pillar trim, and an attachment of the vehicle cabin structure according to the further embodiment, as taken along line B-B shown in FIG. 4.

A procedure for securing an attachment 40 to the pillar trim 61 shown in FIG. 6 is described below by reference to FIG. 7. The structure of the attachment 40 is similar to that described above referring to FIG. 5. The present embodiment differs in that the width of the positioning member 38 and the width of the base 41 are both wider than the opening width of the opening 65, and in that, at the time of mounting, the positioning member 38 is arranged in the groove 64, and the positioning member 38 and the base 41 are fastened to each other with the bolt 43 through the opening 65.

First, the positioning member 38 is arranged inside the groove 64 in the pillar trim 61. Subsequently, the protrusion 38b of the positioning member 38 is fitted at a desired position in the opening 65 so as to select the position. Then, as described above with reference to FIG. 5, the base 41 of the attachment 40 is arranged opposite to the positioning member 38, and the bolt 43 is screwed into the threaded hole in the positioning member 38. When the bolt is tightened, the bolt 43 fastens the positioning member 38 and the base 41 to each other through the opening 65. In that state, the peripheral lip portions 66 of the groove 64 in the pillar trim 61 are firmly sandwiched between the positioning member 38 and the base 41. In this way, the base 41 is secured onto the pillar trim 61.

While the pillar trim 61 of the vehicle cabin structure 60 according to another embodiment was described above, a side member trim (not shown) of the vehicle cabin structure 60 also has, in its vehicle cabin inside facing portion having a large plate thickness, a groove formed extending in the vehicle longitudinal direction along the upper side member 12, similar to the pillar trim 61. Further, the groove provided in the side member trim also has an opening width narrower than an inner groove width, and has lip portions formed on both sides of the opening. When securing the attachment 40, the lip portions are sandwiched and fixed between the positioning member 38 and the base 41.

The vehicle cabin structure 60 achieves effects similar to those achieved by the vehicle cabin structure 30 described earlier.

Figure 8:
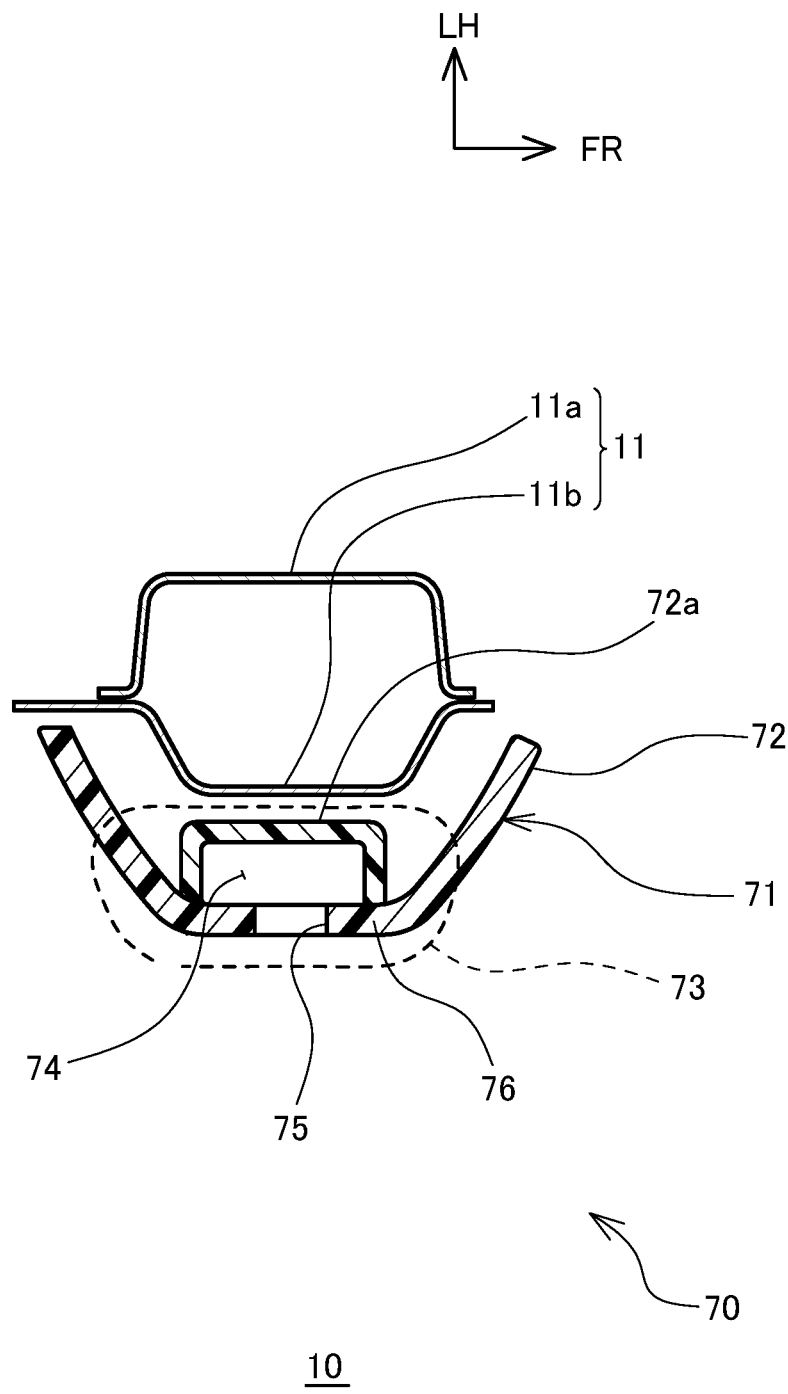
FIG. 8 is a cross-sectional view of a pillar and a pillar trim of a vehicle cabin structure according to another embodiment.

Next, a vehicle cabin structure 70 according to another embodiment is described by reference to FIG. 8. In FIG. 8, only a pillar trim 71 and the pillar 11 are shown. Other constituent components of the vehicle cabin structure 70 are identical to those of the vehicle cabin structure 60 described above referring to FIGS. 6 and 7, and are therefore not shown again.

As shown in FIG. 8, in the vehicle cabin structure 70, the pillar trim 71 is not formed as a single body, but is constituted with two members; namely, a main body 72 and a groove-shaped cross-section member 72a. The main body 72 is a member having a trapezoidal trough-shaped cross-section, and having, in the center of its vehicle cabin inside facing surface, a slit 75 formed extending in the vertical direction along the pillar 11. The groove-shaped cross-section member 72a is a member that is attached to the center part, on the pillar 11 side, of the main body 72 having the slit 75, and that has a groove width wider than a width of the slit 75. When the groove-shaped cross-section member 72a is mounted to the main body 72, the portion around the groove-shaped cross-section member 72a and the slit 75 of the main body 72 constitutes a vehicle cabin inside facing portion 73. Further, the inside of the groove-shaped cross-section member 72a constitutes a groove 74, while the slit 75 constitutes an opening of the groove 74. Furthermore, the width of the slit 75 serving as the opening is narrower than the groove width of the groove 74, and lip portions 76 are formed on respective sides of the slit 75 in the width direction.

While the pillar trim 71 of the vehicle cabin structure 70 according to another embodiment was described above, a side member trim (not shown) of the vehicle cabin structure 70 is also constituted with a main body having a trapezoidal trough-shaped cross-section and with a groove-shaped cross-section member, similar to the pillar trim 71.

The vehicle cabin structure 70 achieves effects similar to those achieved by the vehicle cabin structure 30 described earlier.

Next, a vehicle cabin structure 80 according to another embodiment is described by reference to FIGS. 9 to 13. In the following, elements similar to those of the vehicle cabin structure 30 according to the embodiment described earlier referring to FIGS. 1 to 5 are labeled with like reference numerals, and descriptions thereof will not be repeated.

Figure 9:
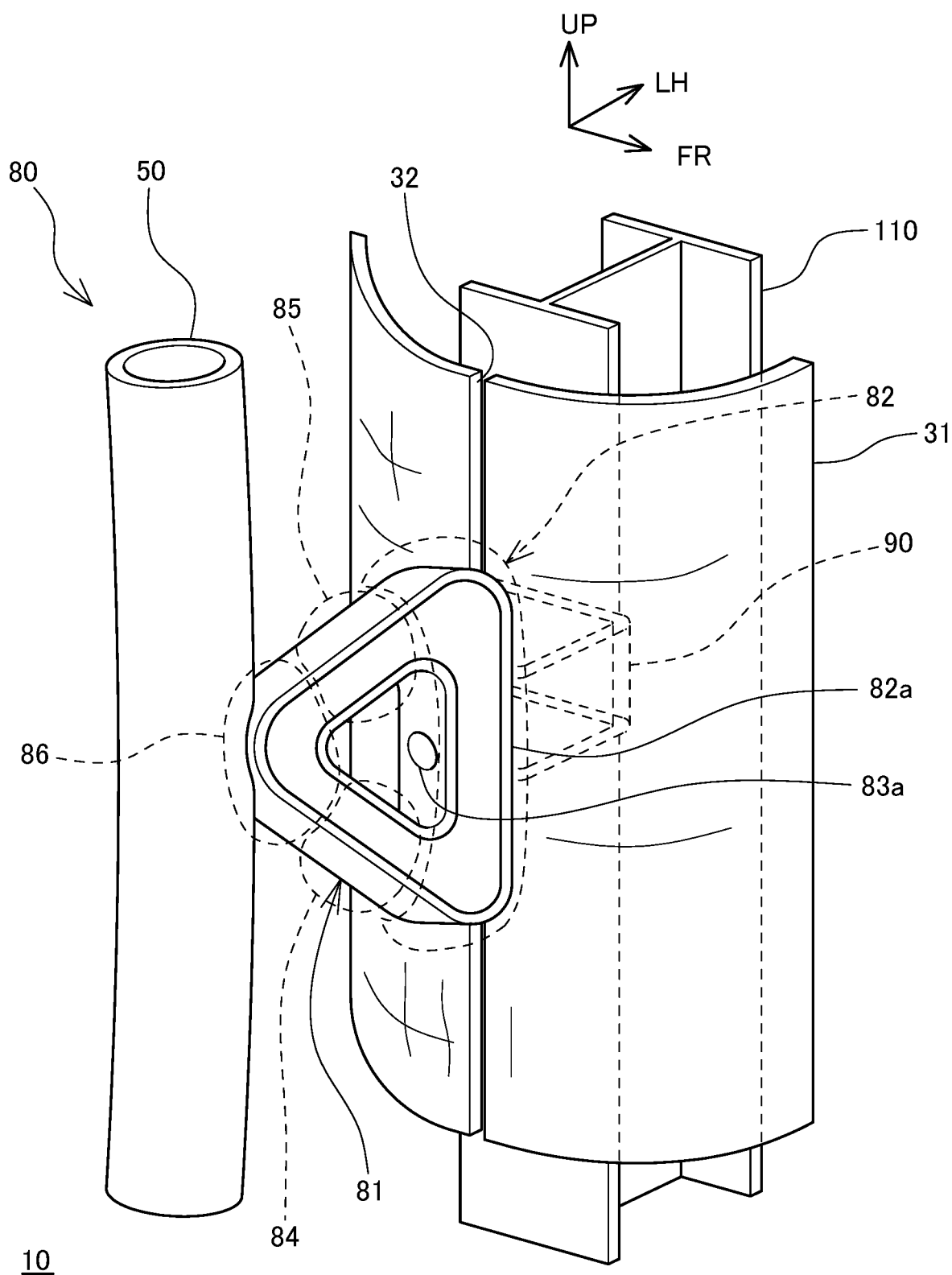
FIG. 9 is a perspective view of a vehicle cabin structure according to a further embodiment as viewed from inside the vehicle.

As shown in FIG. 9, the vehicle cabin structure 80 is configured by attaching a base portion 82 of a triangular attachment 81 having a triangular annular shape to a positioning member 90 mounted to a pillar 110, and further attaching a handrail 50 to a tip portion 86 of the triangular attachment 81. Concerning the vehicle cabin structure 80, the pillar 110 is described as a member having an H-shaped, open cross-section.

Figure 10:
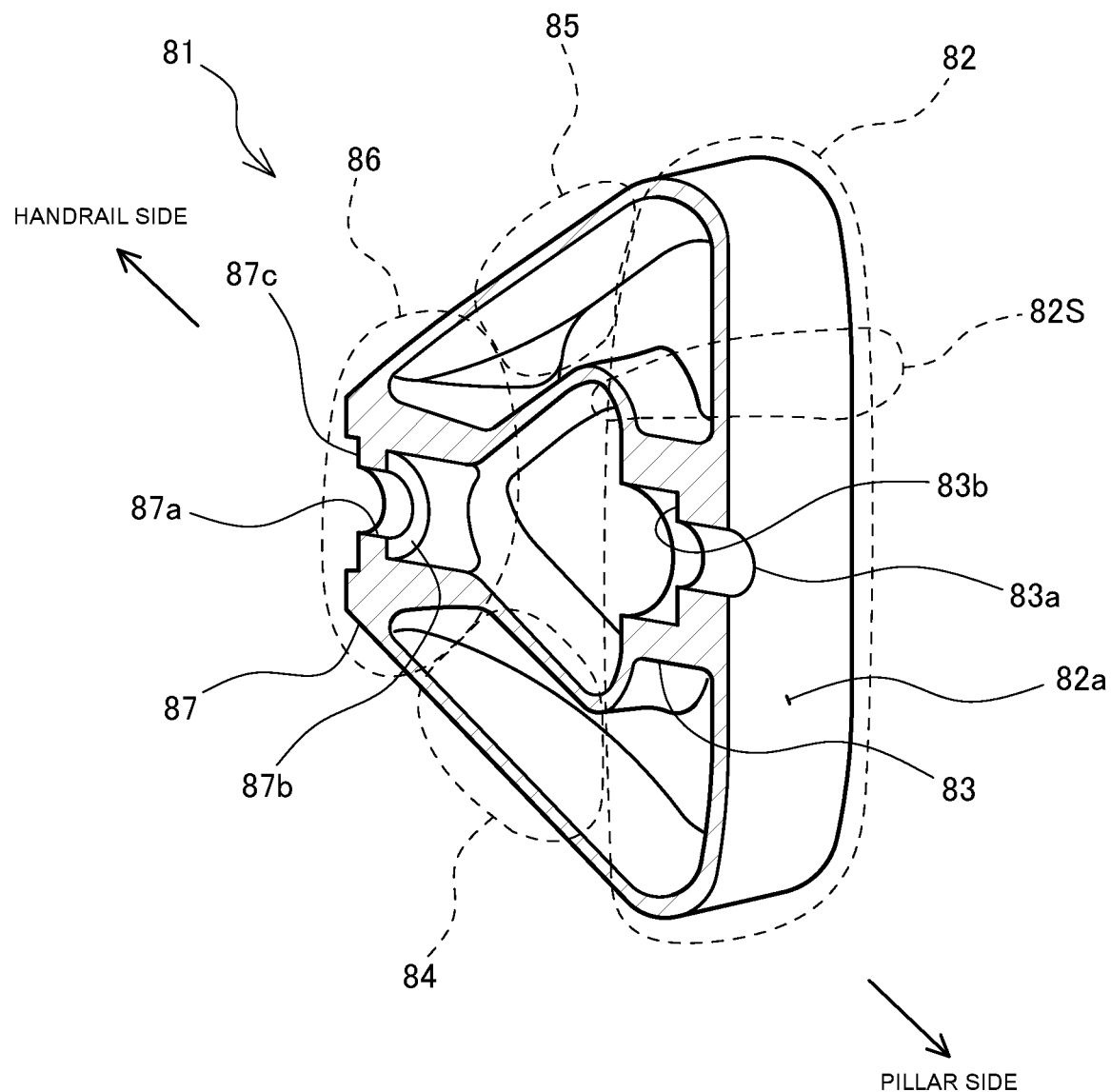
FIG. 10 is a cross-sectional perspective view of a triangular attachment of the vehicle cabin structure shown in FIG. 9.

As shown in FIGS. 9 and 10, the triangular attachment 81 is a member having a triangular annular shape with a substantially rectangular cross-section, comprising the base portion 82 which is a side facing toward the pillar, the tip portion 86 which is located toward the handrail and which is a vertex portion located opposite to the base portion 82, and two diagonal portions 84, 85 connecting between the base portion 82 and the tip portion 86. The triangular attachment 81 is made of metal, and may be shaped using a three-dimensional printer or shaped by casting or the like.

Figure 11A:
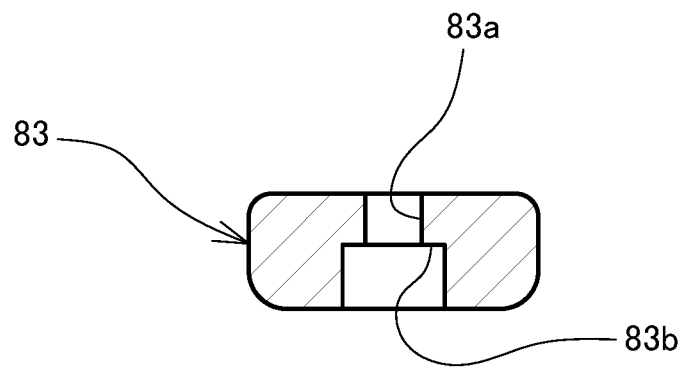
FIG. 11A is a cross-sectional view of a base fastening portion of the triangular attachment shown in FIG. 9.
Figure 11B:
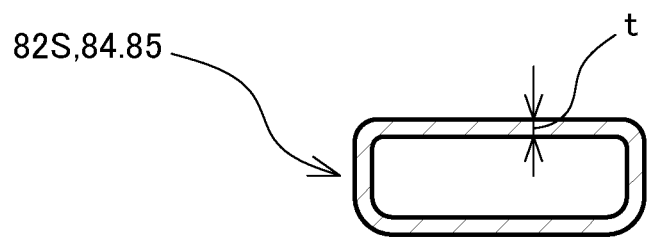
FIG. 11B is a cross-sectional view of bilateral lengthwise adjacent portions located adjacent to the base fastening portion, and of diagonal portions in the triangular attachment shown in FIG. 9.

The base portion 82 includes, in its center part in the lengthwise direction, a base fastening portion 83 to be fastened to the positioning member 90 described further below. As shown in FIG. 11A, the base fastening portion 83 has a solid cross-section having a substantially rectangular shape with corners having R (radius of curvature), and includes, in the center, a stepped aperture 83$a$ to be penetrated by a bolt 95 (see FIG. 12) for fastening the base fastening portion 83 to the positioning member 90. Bilateral lengthwise adjacent portions 82S located bilaterally adjacent to the base fastening portion 83 of the base portion 82 have a rectangular, hollow cross-section having a thickness t and having a substantially rectangular annular shape with corners having R, as shown in FIG. 11B. The bilateral lengthwise adjacent portions 82S adjacent to the base fastening portion 83 are connected to the diagonal portions 84, 85. The bilateral lengthwise adjacent portions 82S adjacent to the base fastening portion 83 may be configured to have a thickness t that increases toward the base fastening portion 83. With this arrangement, the difference in thickness between the solid base fastening portion 83 and the bilateral lengthwise adjacent portions 82S having a hollow cross-section can be reduced, to thereby suppress generation of dents in a design surface of the bilateral lengthwise adjacent portions 82S at the time of shaping.

Figure 11C:
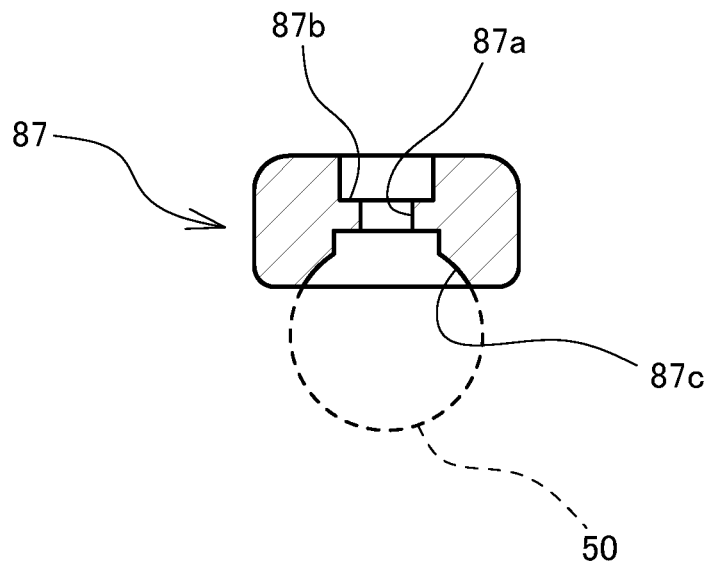
FIG. 11C is a cross-sectional view of a tip fastening portion of the triangular attachment shown in FIG. 9.

The tip portion 86 comprises a tip fastening portion 87 to which the handrail 50 is fastened. As shown in FIG. 11C, the tip fastening portion 87 has a solid cross-section having a substantially rectangular shape with corners having R, and includes, in the center, a stepped aperture 87$a$ to be penetrated by a bolt 52 (see FIG. 12) for fastening the handrail 50 to the tip fastening portion 87. Further, at the tip side of the tip fastening portion 87, a recess 87$c$ having a cylindrical surface shape is provided, into which a side surface of the handrail 50 is fitted.

The diagonal portions 84, 85 having a substantially rectangular, hollow cross-section having a thickness t as shown in FIG. 11B connect between the bilateral lengthwise adjacent portions 82S adjacent to the base fastening portion 83 and the tip fastening portion 87. Parts of the diagonal portions 84, 85 located toward the tip fastening portion 87 have a thickness t that increases toward the tip fastening portion 87. With this arrangement, the difference in thickness between the solid tip fastening portion 87 and the diagonal portions 84, 85 having a hollow cross-section can be reduced, to thereby suppress generation of dents in a design surface of the parts of the diagonal portions 84, 85 near the tip fastening portion 87 at the time of shaping.

Figure 12:
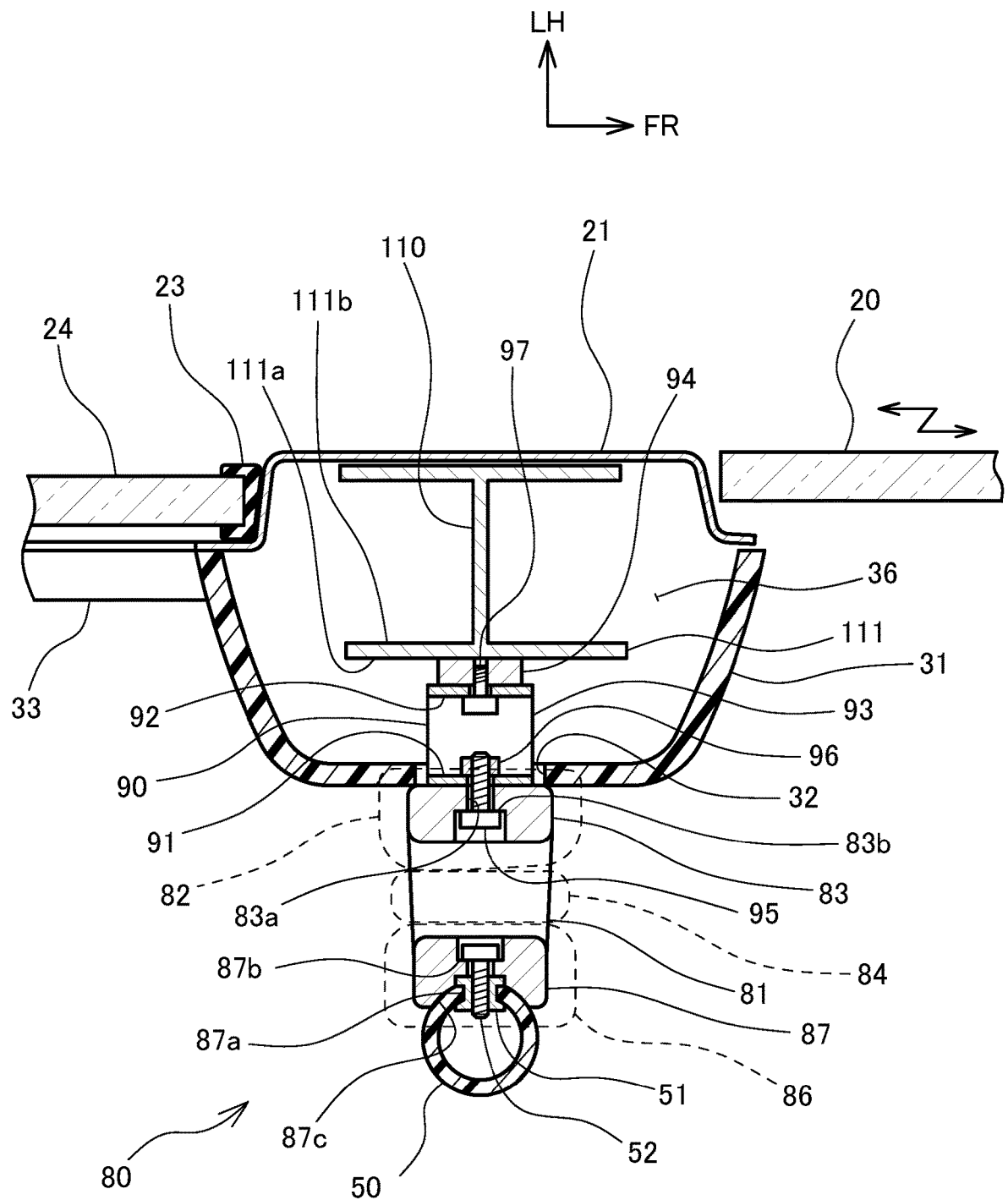
FIG. 12 is a horizontal cross-sectional view of the vehicle cabin structure shown in FIG. 9.
Figure 13:
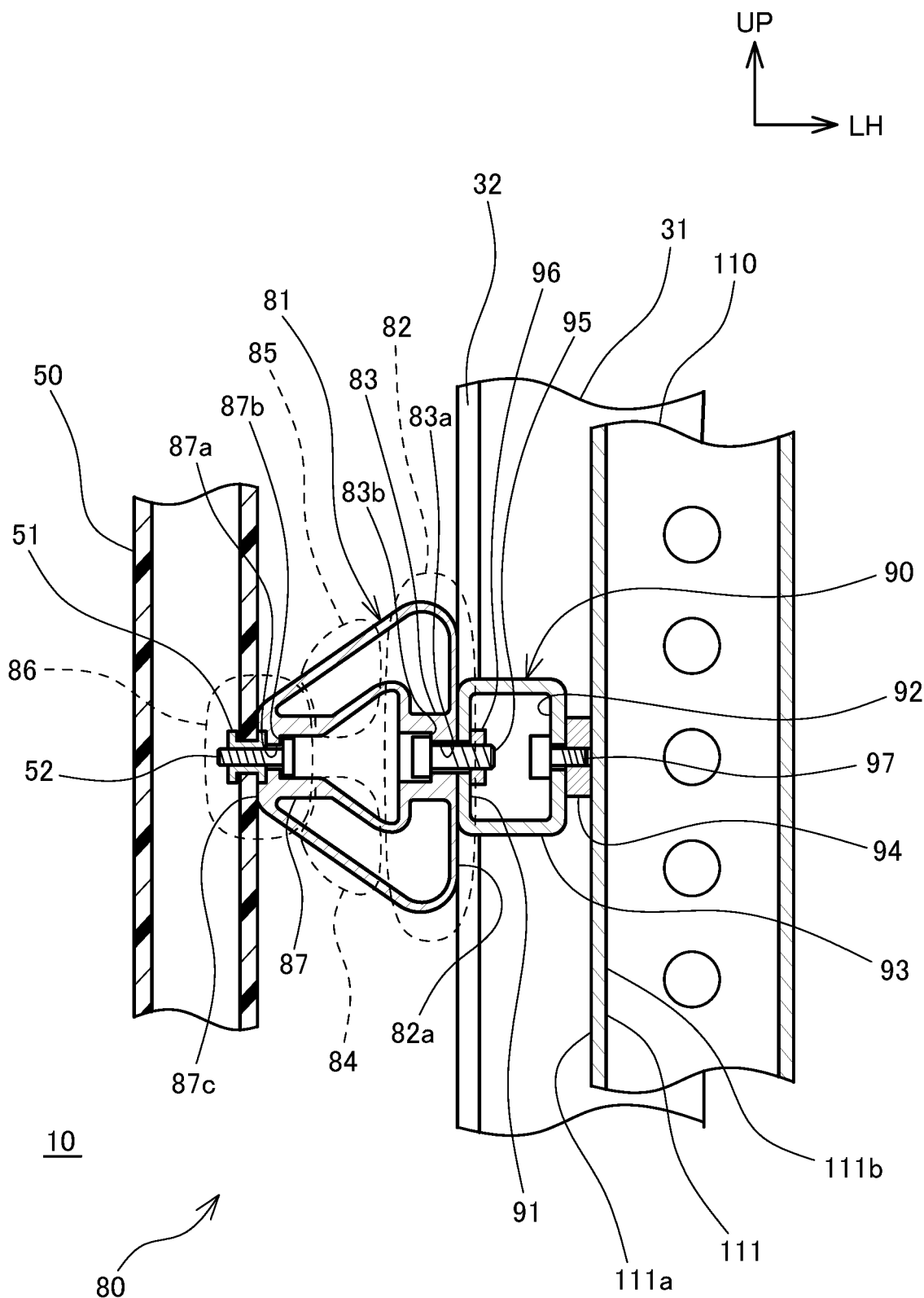
FIG. 13 is a vertical cross-sectional view of the vehicle cabin structure shown in FIG. 9.

As shown in FIGS. 12 and 13, the positioning member 90 is a metallic member having a substantially rectangular, annular cross-section, comprising a vehicle cabin facing plate 91, a frame facing plate 92, and a side plate 93 connecting between the vehicle cabin facing plate 91 and the frame facing plate 92. The frame facing plate 92 constitutes one end of the positioning member 90, while the vehicle cabin facing plate 91 constitutes the other end of the positioning member 90.

On a vehicle cabin inside facing surface 111$a$ of a vehicle cabin inner side flange 111 of the pillar 110, a nut 94 is fixed by welding. The frame facing plate 92 is secured to the vehicle cabin inner side of the nut 94 by fastening with a bolt 97. A plurality of nuts 94 are mounted to the pillar 110 along the lengthwise direction, and the frame facing plate 92 is fastened with the bolt 97 to the nut 94 located at a position suitable as the position for an interior article to be fastened to the triangular attachment 81. Thus, the vehicle cabin structure 80 is configured such that the position of attachment of the frame facing plate 92 to the pillar 110 is changeable.

The side plate 93 extends from the frame facing plate 92 toward the vehicle cabin inside, and the vehicle cabin facing plate 91 is located within the slit 32 in the pillar trim 31. A vehicle cabin inside facing surface of the vehicle cabin facing plate 91 is substantially coplanar with the plane of the vehicle cabin inside facing surface of the pillar trim 31. An aperture to be penetrated by the bolt 95 is provided in the center of the vehicle cabin facing plate 91, and a nut 96 into which the bolt 95 is to be screwed is fixed by welding to a surface of the periphery, on the pillar side, of the aperture.

As shown in FIGS. 12 and 13, the handrail 50 is an elongate member having a circular cross-section. A pop nut 51 is hammered into the handrail 50 at a portion to which the triangular attachment 81 is to be fastened. The pop nut 51 is a member comprising an outer peripheral surface that fits in a hole created in a side surface of the handrail 50, and also comprising an inner peripheral surface having a thread formed thereon. Instead of the pop nut 51, an ordinary nut may be embedded in the cylindrical surface.

Mounting of the triangular attachment 81 is carried out as follows. The position of the stepped aperture 83$a$ in the base fastening portion 83 of the triangular attachment 81 is aligned with the position of the aperture in the positioning member 90 arranged within the slit 32 in the pillar trim 31. Subsequently, the bolt 95 is placed through the stepped aperture 83$a$ in the base fastening portion 83 and through the aperture in the positioning member 90, and the bolt 95 is screwed into the nut 96 fixed to the vehicle cabin facing plate 91 of the positioning member 90. When the head of the bolt 95 abuts against the step portion 83$b$ of the stepped aperture 83$a$, the base fastening portion 83 is fastened to the positioning member 90. When the triangular attachment 81 is fastened to the positioning member 90, an outer surface 82$a$ of the base portion 82 contacts the vehicle cabin inside facing surface of the pillar trim 31.

Further, fastening of the handrail 50 to the triangular attachment 81 is carried out as follows. The side surface of the handrail 50 is placed against the recess 87$c$ of the tip fastening portion 87, and the position of the pop nut 51 is aligned with the stepped aperture 87$a$ in the tip fastening portion 87 of the triangular attachment 81. Subsequently, the bolt 52 is placed through the stepped aperture 87$a$, and is screwed into the pop nut 51. When the head of the bolt 52 abuts against the step portion 87$b$ of the stepped aperture 87$a$, the handrail 50 is fastened to the tip fastening portion 87.

In the vehicle cabin structure 80 according to the above-described embodiment, the positioning member 90 is mounted to the pillar 110, the triangular attachment 81 is fastened to the pillar 110, and the handrail 50 is attached to the triangular attachment 81. With this arrangement, the mounting strength of the positioning member 90 is increased, thereby enabling sufficient support of an interior component, such as the handrail 50, which involves application of large load to the triangular attachment 81.

Further, in the vehicle cabin structure 80 according to the above-described embodiment, since a plurality of nuts 94 are mounted to the pillar 110 along the lengthwise direction, the mounting position of the triangular attachment 81 can be changed in accordance with positions of the interior article. Thus, the interior article can be attached at various positions.

In the triangular attachment 81, by configuring the bilateral lengthwise adjacent portions 82S adjacent to the base fastening portion 83 and the diagonal portions 84, 85 to have a hollow cross-section, weight reduction can be achieved. Further, the bilateral lengthwise adjacent portions 82S are configured such that the thickness t of the hollow cross-section increases toward the base fastening portion 83, while the diagonal portions 84, 85 are configured such that the thickness t of the hollow cross-section increases toward the tip fastening portion 87. With this arrangement, it is possible to suppress formation of dents in a design surface near the base fastening portion 83 or the tip fastening portion 87 when shaping the triangular attachment 81 using a three-dimensional printer or the like.

Further, the handrail 50 is configured to be attached to the tip fastening portion 87 of the triangular attachment 81 by screwing the bolt 52 into the pop nut 51 hammered into the handrail 50. With this arrangement, the vehicle cabin inside facing surface of the handrail 50 can be formed as an uninterrupted design surface. Accordingly, when, for example, the color of the handrail 50 is to be made different from other colors inside the vehicle cabin, a line having that color can be provided continuously along the handrail 50 to create a striking design.

While a configuration in which the triangular attachment 81 is mounted to the pillar 110 was described above, it is also possible to configure such that the triangular attachment 81 is mounted to the upper side member 12, and the vehicle cabin facing plate 91 of the positioning member 90 is positioned within the slit 34 in the side member trim 33, similar to the vehicle cabin structure 30 described earlier.

Figure 14:
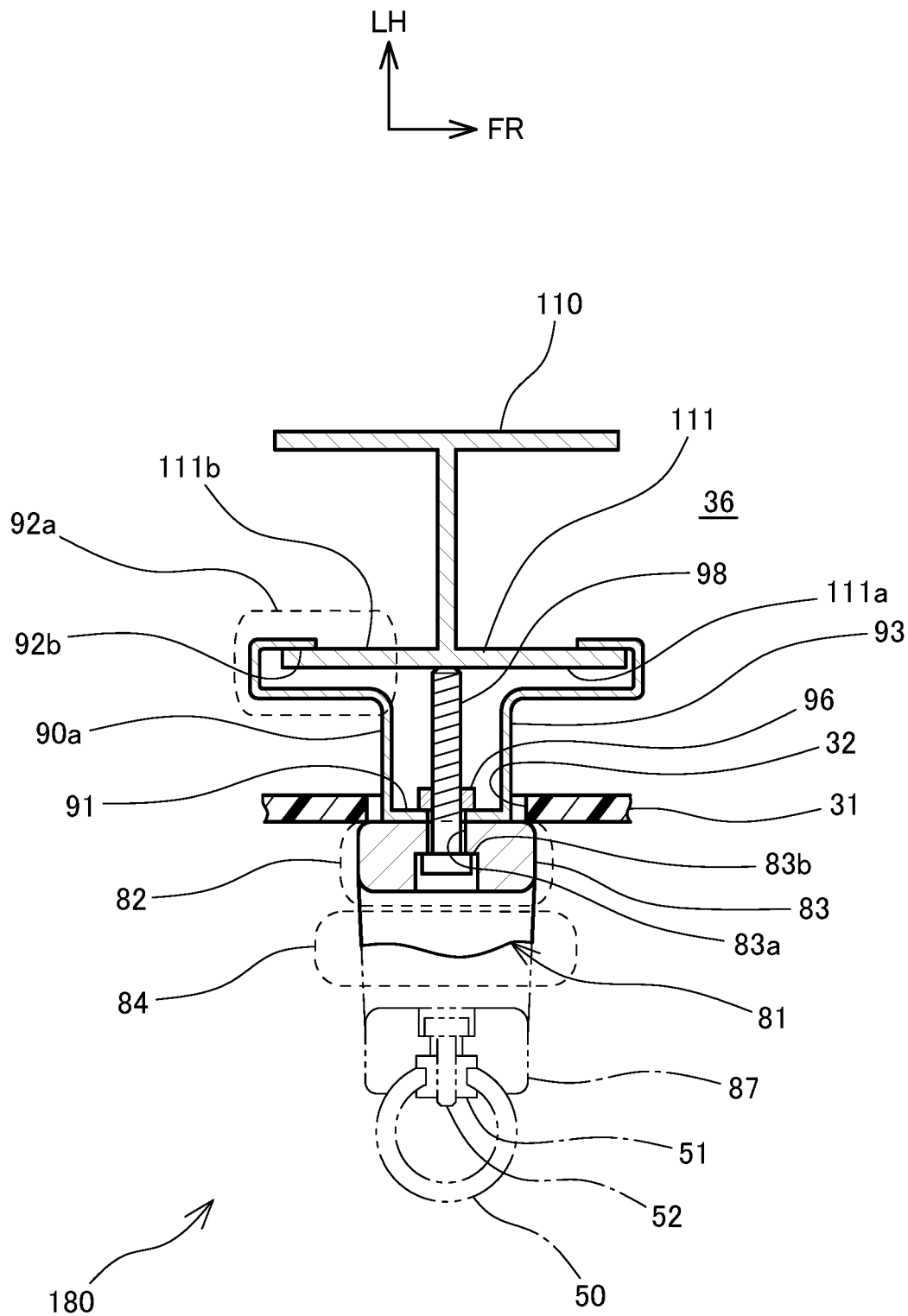
FIG. 14 is a horizontal cross-sectional view showing another vehicle cabin structure in which the positioning member of the vehicle cabin structure shown in FIG. 9 is slidably mounted to the pillar.

Next, a vehicle cabin structure 180 in which a positioning member 90a is slidably mounted to the pillar 110 is described by reference to FIG. 14. As elements other than the structures of the positioning member 90a and a bolt 98 are identical to those in the vehicle cabin structure 80 described above referring to FIGS. 9 to 13, those elements will not be described again.

The positioning member 90a comprises a side plate 93 having, at its frame facing end, a hook 92a that sandwiches the vehicle cabin inner side flange 111 of the pillar 110 in the plate thickness direction from its sides. The positioning member 90a is slidable in the lengthwise direction of the pillar 110. Further, the length of the bolt 98 is such that the tip of the bolt 98 abuts against the vehicle cabin inside facing surface 111a of the flange 111 when the bolt 98 is screwed into the nut 96 on the positioning member 90a.

When the bolt 98 is screwed into the nut 96, the head of the bolt 98 abuts against the step portion 83b of the stepped aperture 83a, and fastens the triangular attachment 81 to the vehicle cabin facing plate 91 of the positioning member 90a. At the same time, the tip of the bolt 98 abuts against the vehicle cabin inside facing surface 111a of the flange 111 of the pillar 110. When the bolt 98 is tightened, an engagement surface 92b of the hook 92a is urged against the vehicle cabin outside facing surface 111b of the flange 111, and positioning member 90a is secured to the pillar 110.

In the vehicle cabin structure 180 described above, the positioning member 90a can be mounted to the pillar 110 at an arbitrary position in the lengthwise direction. Further, the mounting position can be changed, so that an interior article can be attached at any desired position.

Next, a vehicle cabin structure 280 in which a positioning member 90b is fixed by welding to the pillar 110 is described by reference to FIG. 15. As elements other than the positioning member 90b are identical to those in the vehicle cabin structure 80 described earlier with reference to FIGS. 9 to 13, those elements will not be described again.

Figure 15:
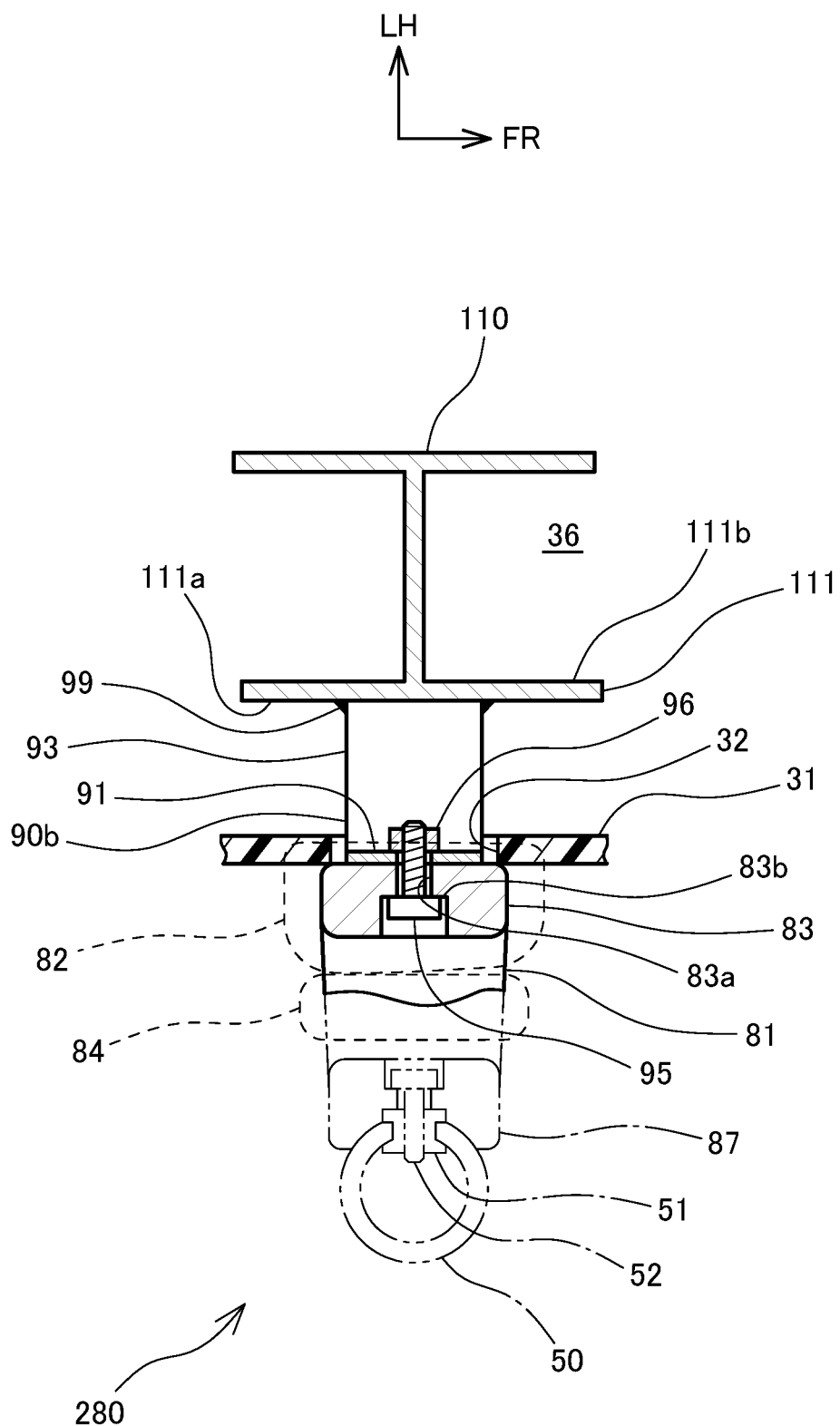
FIG. 15 is a horizontal cross-sectional view showing another vehicle cabin structure in which the positioning member of the vehicle cabin structure shown in FIG. 9 is fixed by welding to the pillar.

As shown in FIG. 15, the positioning member 90b comprises the side plate 93 having the pillar 110 facing end that is fixed by welding 99 to the vehicle cabin inside facing surface 111a of the vehicle cabin inner side flange 111 of the pillar 110. In the vehicle cabin structure 280, the positioning member 90b is provided in a plural number along the lengthwise direction of the pillar 110, so that the mounting position of the triangular attachment 81 can be selected according to the interior article to be attached. Further, as the positioning member 90b is fixed by welding 99 to the pillar 110, the mounting strength of the positioning member 90b with respect to the pillar 110 is increased as compared to in the vehicle cabin structure 180 described above referring to FIG. 14, and an interior article which involves application of large load to the triangular attachment 81 can be supported more reliably.

The invention claimed is:

1. A vehicle cabin structure comprising:
    a frame member extending in a vehicle vertical direction or a vehicle longitudinal direction and constituting a framework of a vehicle cabin;
    a frame trim which is an interior member arranged with a clearance from a vehicle cabin inside facing surface of the frame member and covering the vehicle cabin inside facing surface of the frame member, a surface of the frame trim facing toward inside of the vehicle cabin includes a slit extending along the frame member;
    a positioning member arranged in the clearance between the frame trim and the frame member and having a width larger than the slit;
    an attachment arranged opposing the positioning member across the slit and having a width larger than the slit, the attachment capable of fixing an interior article on the inside of the vehicle cabin; and
    a fastening member that fastens the positioning member and the attachment to each other via the slit and secures the attachment to the frame trim.

2. A vehicle cabin structure comprising:
    a frame member extending in a vehicle vertical direction or a vehicle longitudinal direction and constituting a framework of a vehicle cabin; and
    a frame trim which is an interior member covering a vehicle cabin inside facing surface of the frame member, wherein
    the frame trim includes, in its vehicle cabin inside facing portion, a groove extending along the frame member; and
    the groove has an opening width which is narrower than its inner groove width.

3. The vehicle cabin structure according to claim 2, further comprising:
    a positioning member arranged in the groove in the frame trim and having a width larger than the opening width of the groove;
    an attachment arranged opposing the positioning member across an opening of the groove and having a width larger than the opening width of the groove, the attachment capable of fixing an interior article on the inside of the vehicle cabin; and
a fastening member that fastens the positioning member and the attachment to each other via the opening of the groove and secures the attachment to the frame trim.

4. The vehicle cabin structure according to claim 1, wherein
the frame member is a pillar extending in the vehicle vertical direction, or is an upper side member connected to the pillar and extending in the vehicle longitudinal direction;
the frame trim has the attachment secured thereto in a plural number; and
a handrail is fixed to the attachments.

5. The vehicle cabin structure according to claim 3, wherein
the frame member is a pillar extending in the vehicle vertical direction, or is an upper side member connected to the pillar and extending in the vehicle longitudinal direction;
the frame trim has the attachment secured thereto in a plural number; and
a handrail is fixed to the attachments.

6. A vehicle cabin structure comprising:
a frame member extending in a vehicle vertical direction or a vehicle longitudinal direction and constituting a framework of a vehicle cabin;
a frame trim which is an interior member arranged with a clearance from a vehicle cabin inside facing surface of the frame member and covering the vehicle cabin inside facing surface of the frame member, a surface of the frame trim facing toward inside of the vehicle cabin includes a slit extending along the frame member;
a positioning member having one end attached to the frame member and the other end extending into the slit in the frame trim; and
an attachment having a base portion fastened to the other end of the positioning member and a tip portion to which an interior article is fastened.

7. The vehicle cabin structure according to claim 6, wherein
the one end of the positioning member is attached to the frame member in such a manner that a position of attachment to the frame member is changeable.

8. The vehicle cabin structure according to claim 6, wherein
the positioning member is provided in a plural number, and
the positioning members are secured to respective portions of the frame member.

9. The vehicle cabin structure according to claim 6, wherein
the attachment has a triangular annular shape with a substantially rectangular cross-section, wherein
one side constitutes the base portion; and
a vertex portion located opposite to the one side constitutes the tip portion.

10. The vehicle cabin structure according to claim 7, wherein
the attachment has a triangular annular shape with a substantially rectangular cross-section, wherein
one side constitutes the base portion; and
a vertex portion located opposite to the one side constitutes the tip portion.

11. The vehicle cabin structure according to claim 8, wherein
the attachment has a triangular annular shape with a substantially rectangular cross-section, wherein
one side constitutes the base portion; and
a vertex portion located opposite to the one side constitutes the tip portion.

12. The vehicle cabin structure according to claim 9, wherein
the base portion of the attachment includes a base fastening portion that is fastened to the other end of the positioning member;
the tip portion of the attachment includes a tip fastening portion to which an interior article is fastened;
the base fastening portion and the tip fastening portion each have a solid, substantially rectangular cross-section; and
a portion between the base fastening portion and the tip fastening portion has a substantially rectangular, hollow cross-section, and has a thickness that increases toward the base fastening portion or toward the tip fastening portion.

13. The vehicle cabin structure according to claim 10, wherein
the base portion of the attachment includes a base fastening portion that is fastened to the other end of the positioning member;
the tip portion of the attachment includes a tip fastening portion to which an interior article is fastened;
the base fastening portion and the tip fastening portion each have a solid, substantially rectangular cross-section; and
a portion between the base fastening portion and the tip fastening portion has a substantially rectangular, hollow cross-section, and has a thickness that increases toward the base fastening portion or toward the tip fastening portion.

14. The vehicle cabin structure according to claim 11, wherein
the base portion of the attachment includes a base fastening portion that is fastened to the other end of the positioning member;
the tip portion of the attachment includes a tip fastening portion to which an interior article is fastened;
the base fastening portion and the tip fastening portion each have a solid, substantially rectangular cross-section; and
a portion between the base fastening portion and the tip fastening portion has a substantially rectangular, hollow cross-section, and has a thickness that increases toward the base fastening portion or toward the tip fastening portion.

15. The vehicle cabin structure according to claim 9, wherein
the frame member is a pillar extending in the vehicle vertical direction or is an upper side member connected to the pillar and extending in the vehicle longitudinal direction;
the frame member has the positioning member secured thereto in a plural number;
two or more of the plurality of positioning members have attachments, each being said attachment, respectively fastened thereto; and
a handrail is fastened to the attachments.

16. The vehicle cabin structure according to claim 10, wherein the frame member is a pillar extending in the vehicle vertical direction or is an upper side member connected to the pillar and extending in the vehicle longitudinal direction;

the frame member has the positioning member secured thereto in a plural number;

two or more of the plurality of positioning members have attachments, each being said attachment, respectively fastened thereto; and a handrail is fastened to the attachments.

17. The vehicle cabin structure according to claim 11, wherein the frame member is a pillar extending in the vehicle vertical direction or is an upper side member connected to the pillar and extending in the vehicle longitudinal direction;

the frame member has the positioning member secured thereto in a plural number;

two or more of the plurality of positioning members have attachments, each being said attachment, respectively fastened thereto; and a handrail is fastened to the attachments.

* * * * *